Jan. 23, 1940. H. HICKS 2,188,112
PNEUMATIC TIRE SWITCH
Filed Sept. 27, 1937 3 Sheets-Sheet 1
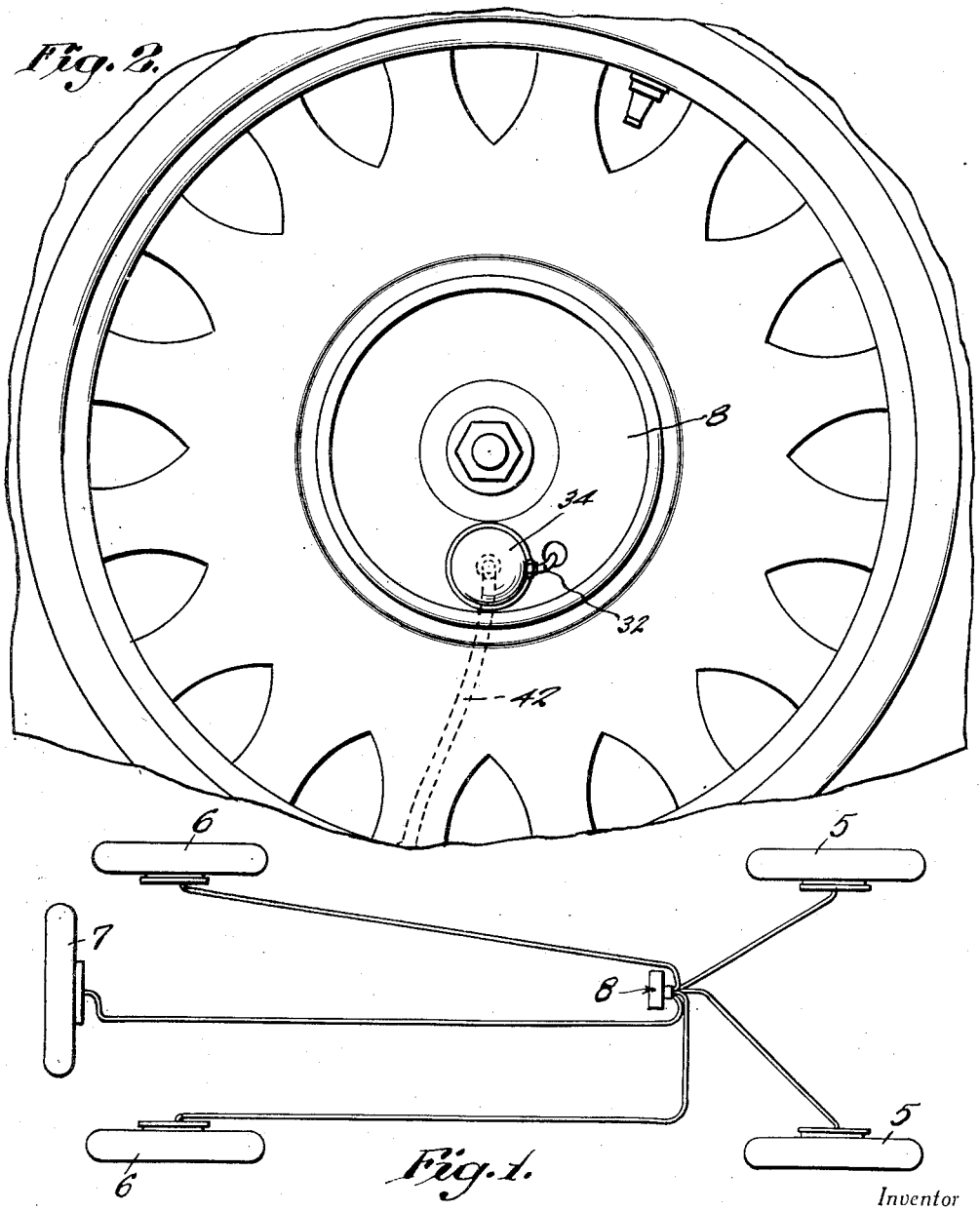
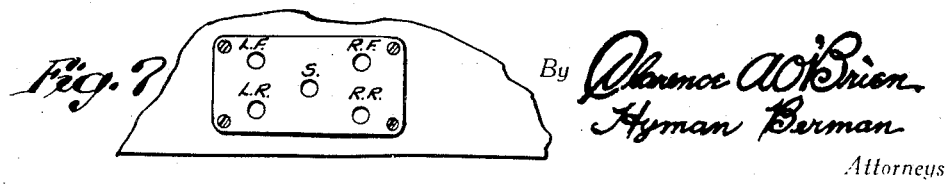
Inventor
Harold Hicks
By Clarence A. O'Brien
Hyman Berman
Attorneys Jan. 23, 1940. H. HICKS 2,188,112
PNEUMATIC TIRE SWITCH
Filed Sept. 27, 1937 3 Sheets—Sheet 3
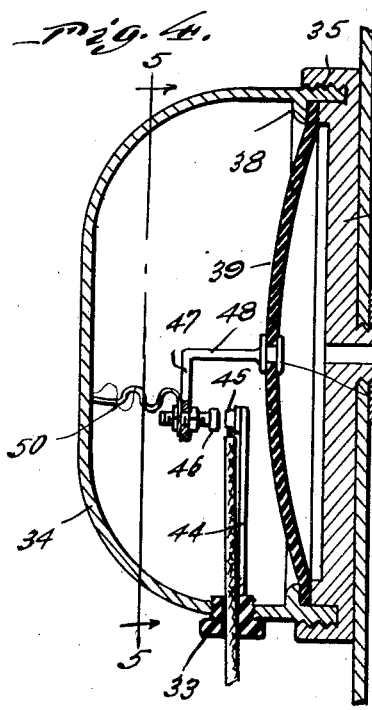
Fig. 4.
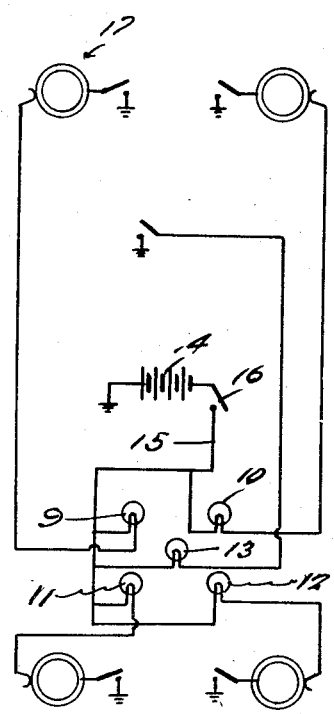
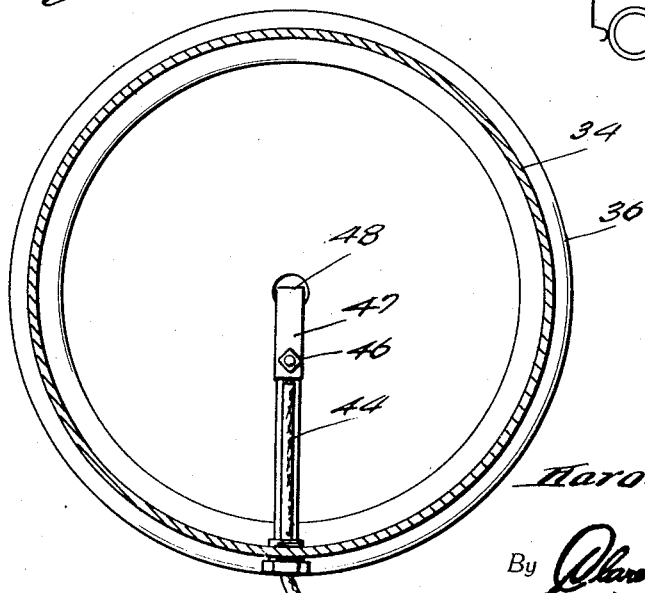
Fig. 5.
Fig. 6.
Inventor
Harold Hicks
By Clarence A. O'Brien
Hyman Berman
Attorneys Patented Jan. 23, 1940

2,188,112

UNITED STATES PATENT OFFICE 2,188,112

PNEUMATIC TIRE SWITCH

Harold Hicks, Yankton, S. Dak., assignor of one-half to Fred L. Vilas and ten per cent to Glenn Clabaugh, both of Pierre, S. Dak.

Application September 27, 1937, Serial No. 166,017

2 Claims. (Cl. 200—58)

This invention appertains to new and useful improvements in signals for automobile pneumatic tires and any other fluid pressure containing chamber. The principal object of the present invention is to provide a pressure indicator for automobile pneumatic wheels for indicating to the driver the pressure condition of his wheels, particularly when the pressure is dangerously low.

Another important object of the invention is to provide a pressure indicator of the character stated which is of simple construction and not susceptible to the ready development of defects.

These and other important objects and advantages of the invention will become apparent to the reader of the following specification:

In the drawings:

Figure 1 represents a diagrammatic view disclosing the electrical connection between the switches of the wheels.

Figure 2 is a fragmentary side elevational view of a wheel equipped with the novel switch means.

Figure 4 is an enlarged fragmentary vertical sectional view through one of the wheel switches.

Figure 5 is a sectional view taken substantially on line 5—5 of Figure 4.

Figure 6 is a diagrammatic view disclosing the electrical connection between the electrical devices involved.

Figure 7 is a fragmentary elevational view of the instrument board of the vehicle showing the indicating light.

Figure 3:
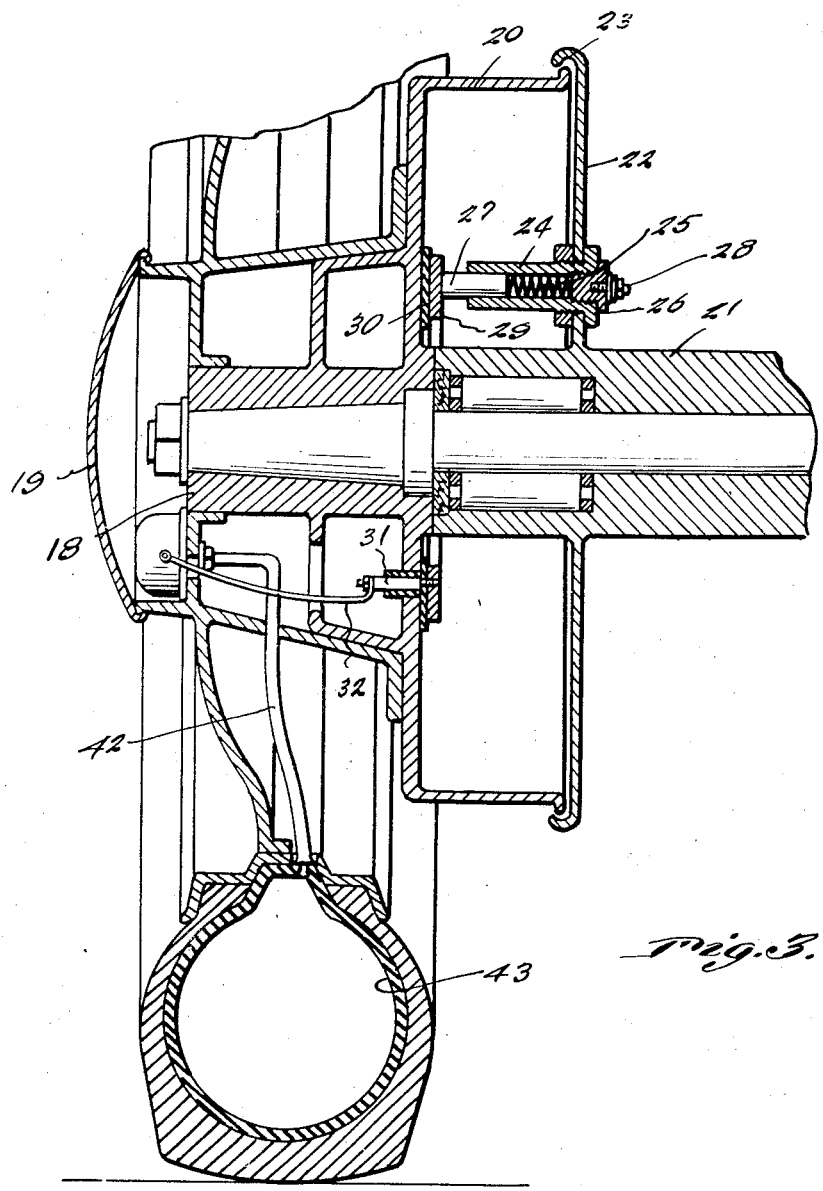
Figure 3 is a fragmentary vertical sectional view through the wheel equipped with the switch means.

Referring to the drawings wherein like numerals designate like parts, it can be seen that in Figure 1 numerals 5—5 represent the front wheels while numerals 6—6 represent the rear wheels and numeral 7 denotes the spare tire. The indicating panel is generally referred to by numeral 8 and has the indicating lamps 9, 10, 11, 12 and 13 for the two front wheels, the rear wheels and the spare tire 7 respectively. As shown in Figure 6 numeral 14 denotes the usual storage battery from which the lead 15 extends. In this lead is the switch 16 whereby the supply of current to the communicating panel 8 can be disconnected when desired. The lead 15 extends to the various lamps 9 to 13 inclusive and from these lamps to the switch devices generally referred to by numeral 17 on the respective wheels, 5—5, 6—6 and 7.

Each wheel structure consists of the hub 18 having the cap 19. This hub carries the brake drum 20 while the axle housing 21 carries the plate 22 lapped over the edge portion of the drum 20 as at 23. The plate 22 carries the brush structure which consists of the barrel 24 of suitable insulation in which the spring 25 is located and interposed between the threaded bushing 26 and the contact element 27. A binding post 28 with a corresponding lamp conductor is provided on the bushing 26. The spring 25 serves to urge the contact element 27 against the conductor annulus 29 which is insulated from the outboard wall of the drum 20 by the annulus 30 of insulation. A binding post 31 extends from the annulus 29 into the hollow part of the hub 18 and from this binding post 31 extends the conductor 32. This conductor extends through the bored plug 33 which is threadedly disposed to the cap structure 34. This cap structure 34 is threadedly disposed as at 35 into the threaded channel of the base 36 which is carried by the portion 37 of the hub 18.

The cap 34 is provided with an internal flange 38 between which and the base 36 the edge portion of the resilient diaphragm 39 is clamped; the base 36 is provided with the bored nipple 40 which extends through the portion 37 of the hub and this is connected by the coupling 41 to the tube 42 which extends to the pneumatic tube 43 of the corresponding wheel.

Rising from the plug 33 is the resilient contact arm 44 having the contact 45 at its inner end opposed to the feedable contact 46 on the leg 47 of the arm 48 which is secured as at 49 to the central portion of the diaphragm 39.

It can now be seen that when the pressure in the tube 43 drops to dangerously low pressure, the pressure will be insufficient to hold the arm 47 away from the arm 44. These arms will contact and current will then flow from the battery through the corresponding lamp to the brush 27 and from there by way of the conductor 32 across the contacts 45—46 and jumper 50 to ground.

While the foregoing specification sets forth the invention in specific terms, it is to be understood that numerous changes in the shape, size and materials may be resorted to without departing from the spirit and scope of the invention as claimed hereinafter.

Having thus described the invention what is claimed as new is:

1. In a low pressure alarm, a base plate having a port therein adapted to be connected to a member containing fluid under pressure, a cap threaded to the base plate, a diaphragm of resilient material clamped between portions of the base plate and cap and forming a chamber with a part of the base plate with which the port is in communication, whereby the diaphragm is held expanded by the pressure, an angle arm connected with the diaphragm, a contact carried by the free end of the said angle arm, a plug threaded in a hole in the cap, a flexible arm connected with the inner end of the plug, a second contact carried by the inner end of the flexible arm, said arm and contact being located between the first-mentioned contact and the diaphragm, whereby when the diaphragm contracts due to low pressure in the chamber formed thereby the two contacts will touch each other and a conductor passing through the bushing and connected with the second contact.

2. In a device of the class described, a base plate having an annular rib on one face thereof and a port passing from the space formed by the rib through the other face and adapted to be connected to a member containing fluid under pressure, a diaphragm of resilient material having its peripheral portion resting on the rib, said base plate having an annular channel therein surrounding the rib with one wall of the channel formed with threads, a cap having one end threaded to engage the threads in the channel, an internal flange on the cap for pressing the peripheral edge of the diaphragm against the rib, a bushing passing through a side portion of the cap, a flexible arm carried by the bushing and extending to a point adjacent the front of the diaphragm, a contact carried by the inner end of the flexible arm, a conductor passing through the bushing and connected with the contact, an angle-shaped arm having one end connected with the front of the diaphragm and an adjustable contact carried by the free end of the angle arm located opposite the first-mentioned contact, with the flexible arm extending between the adjustable contact and the diaphragm, whereby upon contraction of the diaphragm the two contacts will engage each other.

HAROLD HICKS.